Nov. 24, 1925.
C. S. FURMAN
1,563,274
REVERSIBLE COLLAR
Filed Aug. 25, 1925
2 Sheets-Sheet 1
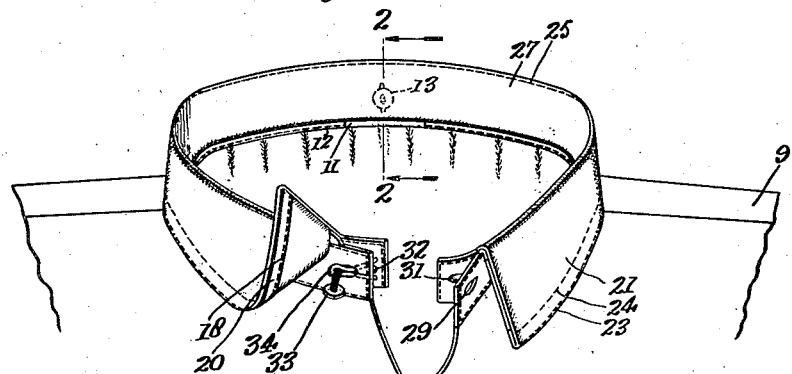
Fig.1.
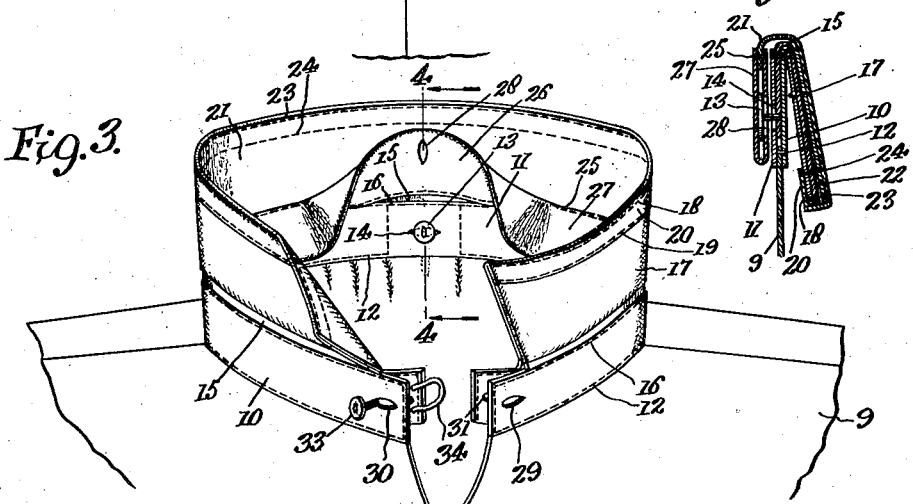
Fig.2.
Fig.3.
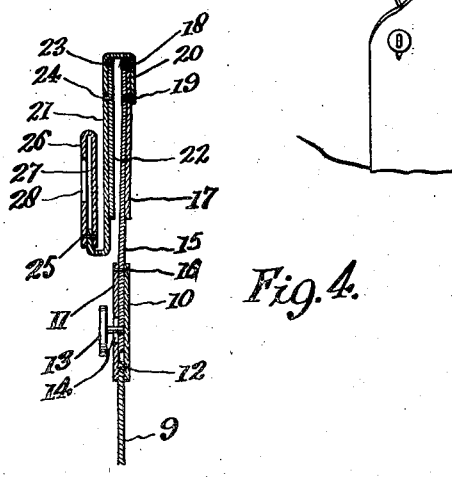
Fig.4.
INVENTOR
Charles S. Furman
BY Wilkinson & Giusta
ATTORNEYS.

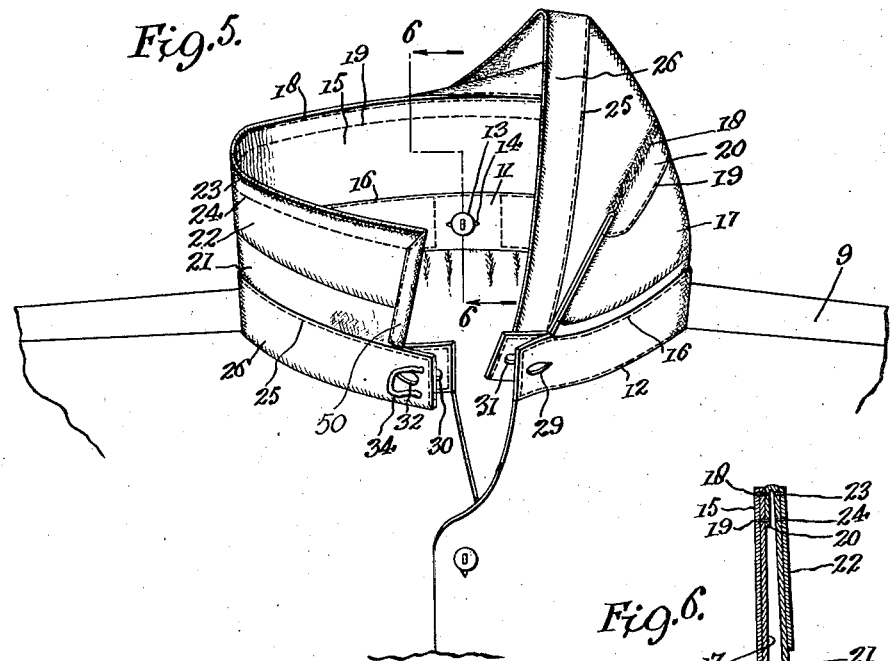
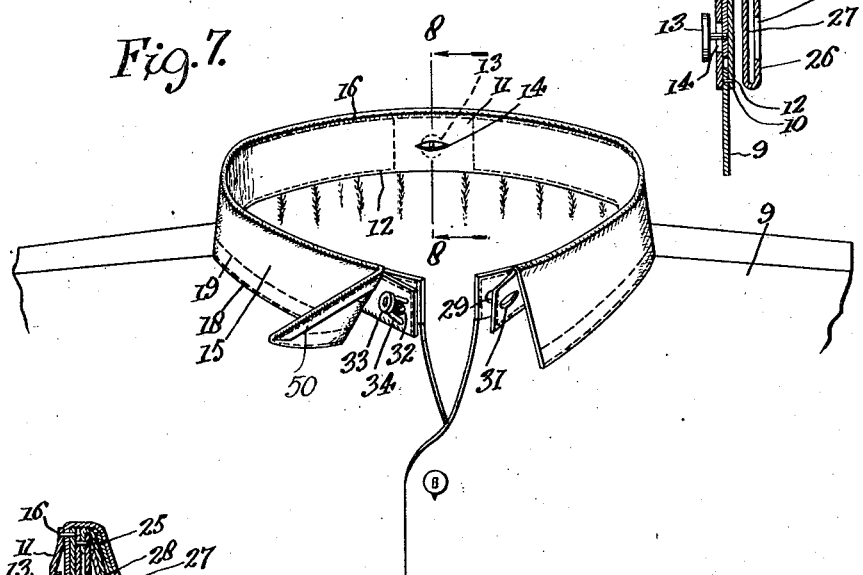

Patented Nov. 24, 1925.

1,563,274

UNITED STATES PATENT OFFICE.

CHARLES S. FURMAN, OF LANSING, MICHIGAN.

REVERSIBLE COLLAR.

Application filed August 25, 1925. Serial No. 52,397.

*To all whom it may concern:*

Be it known that I, CHARLES S. FURMAN, a citizen of the United States, residing at Lansing, in the county of Ingham and State of Michigan, have invented certain new and useful Improvements in Reversible Collars; and I do hereby declare the following to be a full, clear, and exact description of the invention, such as will enable others skilled in the art to which it appertains to make and use the same.

This invention relates to an improvement in collars, and has for an object to provide a reversible collar attached directly to the shirt and being capable of reversal to expose fresh surfaces of the collar when soiled or worn.

Another object of the invention is to provide a shirt attached collar, in which the duplex exterior surfaces of the collar will be reinforced and stiffened, to maintain and preserve a neat, cleanly and smooth appearance throughout their respective periods of wear, and in which improved means is provided for holding the collar against creeping up on the neck.

A further object of the invention lies in providing an improved collar structure, which will admit of this reversibility, and in which the structure is formed integrally and adapted for attachment to existing forms of shirt-bands.

With the foregoing and other objects in view, the invention will be more fully described hereinafter, and will be more particularly pointed out in the claims appended hereto.

In the drawings, wherein like symbols refer to like or corresponding parts throughout the several views:

Fig. 1 is a fragmentary perspective view of the shirt with the improved collar shown in one position;

Fig. 2 is a cross-section taken on the line 2—2 in Fig. 1;

Fig. 3 is also a fragmentary perspective view, with the collar in the raised position to indicate a phase of reversibility;

Fig. 4 is a transverse section taken on the line 4—4 in Fig. 3;

Fig. 5 is also a fragmentary perspective view of the shirt and collar, showing a further stage in its reversibility;

Fig. 6 is a cross-section taken on the line 6—6 in Fig. 5;

Fig. 7 is a further perspective view, showing the final position of the collar parts in the completely reversed position; and Fig. 8 is a transverse section taken on the line 8—8 in Fig. 7.

Referring more particularly to the drawings, 9 designates generally a shirt of any character, to which the outer and inner straps 10 and 11 forming the neckband are stitched, as indicated at 12. As indicated in Fig. 4, a central portion of the inner strap 11 is left unstitched, to permit this intermediate portion to be drawn over the button 13, as shown in Fig. 8. A buttonhole 14 in the inner strap 11 extends behind the button 13, and this buttonhole is engaged over the button, as indicated in Fig. 4.

The collar surface ply or section 15 is received between the straps 10 and 11, and the upper edges of the straps are stitched to this ply or collar section 15, as indicated at 16. On the inner side of the ply or collar section 15 is a stiffening ply 17 of a length to extend over the turned-down area of the collar section 15. As shown clearly in Fig. 4, there is a space or gap left between the adjacent edge of the stiffening ply 17 and the upper edge of the outer strap 10 of the neckband. This reduces the thickness at this point to a single ply and promotes flexibility in the collar. The collar may thus be turned down outwardly as indicated in Fig. 2, or in the reversed position, as illustrated in Fig. 8.

The collar section 15 and stiffening ply 17 are secured together by parallel and spaced lines of stitching 18 and 19, passing through the same near their outer edges. These two lines of stitching also serve to secure to this collar section and its ply the over-turned edge 20 of the second collar section or ply 21. This collar section 21 is reinforced and strengthened by stiffening ply 22, similar to the ply 17 and of substantially the same width. The stiffening ply 22 lies along one side of the collar section 21 and is stitched thereto as by the two spaced and parallel lines of stitching 23 and 24. The width of the collar section 21 is greater than the width of its reinforcing ply 22, and extends there-beyond. To the free edge of the collar section 21 is secured, as by the stitching 25, the overlapped edges of an anchoring band composed of the straps 26 and 27. In the intermediate portion of the strap 26 is a buttonhole 28 in position to engage the button 13, in order to hold the rear portion of the collar to the shirtband and prevent this intermediate portion from buckling up or creeping up on the neck. Otherwise, the collar might become distorted, creased and out of shape.

The neckband of the shirt is provided with the usual buttonholes 29 and 30, while the anchoring band is provided with the buttonholes 31 and 32 in position to register respectively with the buttonholes 29 and 30 of the collar band. The collar band carries adjacent the buttonhole 30 a button 33, carried on an elongated flexible shank, and this button and shank are adapted to be engaged by a flexible tape or loop 34, secured to the free end of the anchoring band adjacent the buttonhole 32. This loop is arranged to be passed through the buttonhole 30, as shown in Fig. 1, and to be engaged about the button 33.

In the use of the device, Fig. 1 shows one position of the collar presenting the soft turned-down appearance. The end of the collar at the left is turned up, to expose the underneath parts for clearness.

Fig. 2 shows a section taken through this collar. The collar section 21 is exposed and is reinforced underneath by the stiffening ply 22, which maintains the outer surface of the section 21 in a smooth neat appearance, and prevents the material from creeping. The lower edge of the collar is reinforced by the overlapped part 20, and double lines of stitching are provided on both inner and outer plies of the collar at the lower edge, to reinforce, stiffen and strengthen this portion of the collar. This stitching and reinforcement serves to preserve the form and shape of the collar and to keep it in a neat condition for an extended period of time. In this condition of the collar, the button 13 is not only passed through the buttonhole 14 of the inner strap 11 of the collarband, but also through the buttonhole 28 of the anchoring band, which is presented to it. The button 13 will thus hold down the anchoring band and keep the upper edge of the collar in proper position at all times.

When the surface 21 becomes worn or soiled, the collar may be reversed. This is accomplished by first raising the parts to the position shown in Figs. 3 and 4. The button 13 is disengaged from the buttonhole 28. The anchoring band is shown raised in Figs. 3 and 4, merely for the sake of clearness in exposing the under portions.

The parts are then turned inside out, as indicated in Fig. 5. The new position of the parts is shown in Fig. 6, with the anchoring band on the outside of the collarband.

As shown in Figs. 7 and 8, the parts are folded over outwardly, to bring the fresh collar section 15 on the exterior. The rear button 13 is then disengaged from the buttonhole 14 to permit the inner strap 11 of the collarband to lie adjacent the neck and to avoid this button pressing upon the back of the wearer's neck. The button 33 in this case is passed through the buttonhole 32 of the anchoring band, it being remembered that this anchoring band has been brought to the outside of the neckband and the shank of this button 33 is engaged about the loop. The shank of the button 33 is long enough to admit of the button being passed through the buttonholes 29 and 31 of the opposite ends of the collarband and anchoring band, whereby the closure of the collar at the front is effected.

It will be appreciated from the foregoing that the invention provides a collar structure, which may be made up separately from the shirt and stitched thereto; that the improved collar construction provides double collar wearing surfaces, both of which are reinforced and stiffened and that the one collar section is kept intact, while the other is exposed, and that the improved construction is simple and inexpensive to make and is readily adjusted to either position, and forms a neat and attractive article of apparel.

The improved collar is useful particularly with materials of different colors. For instance, one collar section could be of velvet for use on an overcoat, while the reversible collar section could be of a cloth to match the body of the coat. Again, one collar section may be silk faced while the reversible section may be of cloth or other material. The front edges of the two collar sections are secured together as indicated at 50 in Figures 5 and 7.

It is obvious that various changes and modifications may be made in the details of construction and design of the above specifically described embodiment of this invention without departing from the spirit thereof, such changes and modifications being restricted only by the scope of the following claims:—

I claim:

1. A reversible collar for shirts comprising a neckband, a collar section secured to said neckband, a second collar section lying substantially parallel with the first section and reversibly secured thereto to expose the first section, said second section covering the wearing surface of the first section in one position and being covered by the first section in the reversed position, and an anchoring band on the second section adapted to be secured to the collar band.

2. A reversible collar for shirts comprising a neckband, a collar section secured thereto, a reinforcing ply against one surface of the section, a second collar section placed beside the first section and flexibly secured to the outer edge of the first section and to said reinforcing ply, said second section being foldable on either side of the first section and said sections being secured together at their front edges, a stiffening ply secured against one face of said second section, and an anchoring band secured to said second section and adapted to overlap with, and be secured to, said collar band.

3. A reversible collar for shirts comprising a collar band having buttonholes at its front open ends and an obscured button at its rear portion with a part lying in front of the button having a buttonhole to admit passage of the button, reversible collar sections secured together and to said collar band, and an anchoring band for one of the sections having a buttonhole to receive said button and other buttonholes at its ends to register with the buttonholes at the front ends of said collar band.

4. A reversible collar for shirts comprising a neckband having buttonholes at its front edges, reversible collar sections secured together and to said neckband, an anchoring band secured to one of the sections and having buttonholes at its ends to register with the buttonholes in the ends of said collar band, a long-shanked button secured to said collar band adjacent one of the buttonholes therein, and a loop on the respective end of the anchoring band for engaging about said button.

5. A reversible collar for shirts comprising a collar band secured to the shirt, a collar section secured to the collar band, a second collar section flexibly and reversibly connected to said first section and lying beside the latter, and an anchoring band secured to the free edge of said second section and composed of superposed straps with a buttonhole at the back of one strap, and a button on the neckband to engage through said buttonhole.

CHARLES S. FURMAN.